United States Patent
O'Keeffe et al.

(10) Patent No.: US 8,190,877 B2
(45) Date of Patent: May 29, 2012

(54) TRUSTED CRYPTOGRAPHIC PROCESSOR

(75) Inventors: Sean K. O'Keeffe, Arlington, VA (US); John R. Owens, Carlsbad, CA (US); Richard L. Quintana, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 998 days.

(21) Appl. No.: 11/428,505

(22) Filed: Jul. 3, 2006

(65) Prior Publication Data

US 2007/0245141 A1    Oct. 18, 2007

Related U.S. Application Data

(60) Provisional application No. 60/697,071, filed on Jul. 5, 2005, provisional application No. 60/697,072, filed on Jul. 5, 2005.

(51) Int. Cl.
*H04L 29/06* (2006.01)

(52) U.S. Cl. ........ 713/153; 713/150; 370/351; 370/352; 370/353; 370/354; 370/355; 705/79; 709/238; 709/239; 709/240; 709/241; 709/242; 709/243; 709/244

(58) Field of Classification Search .................. 713/150, 713/153; 370/351–355; 705/79; 709/238–244
See application file for complete search history.

(56) References Cited

U.S. PATENT DOCUMENTS

| | | | |
|---|---|---|---|
| 5,249,188 A | 9/1993 | McDonald | |
| 5,255,367 A | 10/1993 | Bruckert et al. | |
| 5,751,932 A | 5/1998 | Horst et al. | |
| 5,845,060 A | 12/1998 | Vrba et al. | |
| 5,896,523 A | 4/1999 | Bissett et al. | |
| 6,065,135 A | 5/2000 | Marshall et al. | |
| 6,067,633 A | 5/2000 | Robbins et al. | |
| 6,101,255 A | 8/2000 | Harrison et al. | |
| 6,178,244 B1 * | 1/2001 | Takeda et al. ................. | 380/277 |
| 6,226,742 B1 | 5/2001 | Jakubowski et al. | |
| 6,279,119 B1 | 8/2001 | Bissett et al. | |
| 6,356,795 B1 | 3/2002 | Barthel et al. | |
| 6,363,453 B1 | 3/2002 | Esposito et al. | |
| 6,363,464 B1 | 3/2002 | Mangione | |

(Continued)

FOREIGN PATENT DOCUMENTS

EP    674262 A    9/1995

(Continued)

OTHER PUBLICATIONS

Deconinck, Geert et al., "The EFTOS Approach to Dependability in Embedded Supercomputing," IEEE Transactions on Reality, Mar. 2002, vol. 51, Issue 1, p. 76-90.

(Continued)

*Primary Examiner* — Edan Orgad
*Assistant Examiner* — Roderick Tolentino
(74) *Attorney, Agent, or Firm* — Kilpatrick Townsend & Stockton LLP (57) ABSTRACT

A cryptographic processor for redundantly-processing cryptographic operations is disclosed. The cryptographic processor includes a number of input ports, a first and second cryptographic engines, comparison logic and a plurality of output ports. The number of input ports is configured to accept both plaintext and ciphertext. Each of the number of input ports is coupled to both the first and second cryptographic engines. The comparison logic is configured to determine if the first and second cryptographic engines produce a result that is different. The number of output ports is configured to produce both plaintext and ciphertext.

26 Claims, 7 Drawing Sheets

U.S. PATENT DOCUMENTS

| | | | |
|---|---|---|---|
| 6,434,712 | B1 | 8/2002 | Urban et al. |
| 6,665,700 | B1 | 12/2003 | Sugisaki et al. |
| 7,107,484 | B2 | 9/2006 | Yamazaki et al. |
| 7,802,075 | B2 | 9/2010 | Bourdon et al. |
| 2001/0044912 | A1 | 11/2001 | Francis et al. |
| 2003/0039354 | A1* | 2/2003 | Kimble et al. .................. 380/37 |
| 2003/0140255 | A1 | 7/2003 | Ricchetti et al. |
| 2004/0230729 | A1* | 11/2004 | Ho et al. ....................... 710/113 |
| 2005/0021949 | A1* | 1/2005 | Izawa et al. ................... 713/165 |
| 2005/0102244 | A1* | 5/2005 | Dickinson et al. .............. 705/74 |
| 2005/0120218 | A1 | 6/2005 | Echizen et al. |
| 2007/0113224 | A1 | 5/2007 | Bourdon et al. |
| 2007/0113230 | A1 | 5/2007 | Bourdon et al. |

FOREIGN PATENT DOCUMENTS

| | | |
|---|---|---|
| GB | 2399426 A | 9/2004 |
| WO | WO 2007/006011 A2 | 1/2007 |
| WO | WO 2007/006013 A2 | 1/2007 |

OTHER PUBLICATIONS

Supplementary European Search Report for European Application No. EP06786509 dated Dec. 16, 2009, 5 pages.

International Search Report and Written Opinion for PCT/US2006/026374 mailed on Apr. 1, 2008, 4 pages.

International Search Report and Written Opinion for PCT/US2006/026376 mailed on Feb. 4, 2008, 7 pages.

Notice of Allowance of Jul. 22, 2011 for U.S. Appl. No. 11/428,508, 8 pages.

Final Office Action of Mar. 7, 2011 for U.S. Appl. No. 11/428,508, 17 pages.

Interview Summary of Nov. 19, 2010 for U.S. Appl. No. 11/428,508, 4 pages.

Notice of Allowance of May 18, 2010 for U.S. Appl. No. 11/428,516, 8 pages.

Non-Final Office Action of Aug. 27, 2010 for U.S. Appl. No. 11/428,508, 24 pages.

Advisory Action of Jan. 11, 2010 for or U.S. Appl. No. 11/428,508, 4 pages.

Non-Final Office Action of Nov. 20, 2009 for U.S. Appl. No. 11/428,516, 25 pages.

Final Office Action of Oct. 30, 2009 for U.S. Appl. No. 11/428,508, 15 pages.

Non-Final Office Action of Jan. 2, 2009 for U.S. Appl. No. 11/428,508, 15 pages.

Final Office Action of Nov. 19, 2008 for U.S. Appl. No. 11/428,516, 23 pages.

Interview Summary of Aug. 21, 2008 for U.S. Appl. No. 11/428,516, 4 pages.

Final Office Action of May 28, 2008 for U.S. Appl. No. 11/428,508, 15 pages.

Non-Final Office Action of May 13, 2008 for U.S. Appl. No. 11/428,516, 22 pages.

Non-Final Office Action of Nov. 19, 2007 for U.S. Appl. No. 11/428,508, 15 pages.

Extended Search Report mailed on May 27, 2011 for EP Patent Application No. EP 06786507, 7 pages.

* cited by examiner

TRUSTED CRYPTOGRAPHIC PROCESSOR

This application claims the benefit of and is a non-provisional of both U.S. Provisional Application Ser. No. 60/697,071 filed on Jul. 5, 2005; and U.S. Provisional Application Ser. No. 60/697,072 filed on Jul. 5, 2005, which are both assigned to the assigner hereof and hereby expressly incorporated by reference in their entirety for all purposes.

This application is related to all of U.S. patent application Ser. No. 11/428,520, filed Jul. 3, 2006, entitled "TRUSTED CRYPTOGRAPHIC SWITCH"; U.S. patent application Ser. No. 11/428,516, filed Jul. 3, 2006, entitled "SYNCHRONIZED HIGH-ASSURANCE CIRCUITS"; and U.S. patent application Ser. No. 11/428,508, filed Jul. 3, 2006, entitled "TASK MATCHING FOR COORDINATED CIRCUITS"; which are all assigned to the assigner hereof and hereby expressly incorporated by reference in their entirety for all purposes.

BACKGROUND

This disclosure relates in general to cryptographic processing and, but not by way of limitation, to programmable cryptographic processing.

Cryptographic systems are used to secure information. Information systems have advanced as we progress into the Information Age. Cryptographic systems have not kept pace. Only a single algorithm is supported along a single processing path to process items at the highest security levels.

New developments in cryptographic design often obsolete older systems. Cryptographic systems are inflexible and cannot incorporate new developments once fielded. Design of new cryptographic systems is expensive and time consuming. Often a new cryptographic system must be produced for each deployment to cover different classification levels and security issues.

In modern cryptosystems, there is a need for multi-port (multi-channel) operation, where one cryptosystem can support multiple interfaces on both the plaintext and ciphertext interfaces. Current cryptosystems are designed in an unscalable architecture such that ports are added with a linear rise in circuit size and/or complexity. For more complex cryptographic systems, multiple paths at multiple classifications may also be used. Each path may have a separate cryptographic device, for example. Interfacing various devices make for a complex system. Each different cryptographic device may be different or configured differently to support complex data transport paths.

In high-assurance applications such as cryptosystems, there is typically a need to have redundant functions operating in parallel and continuously monitored to ensure correct operations. This monitoring can be particularly problematic when multiple microprocessors need to operate in a synchronized but independent manner. Regardless of whether the microprocessors share the same clock or have independent clocks, the microprocessors must respond to asynchronous events such as interrupts. Because of the asynchronous environment, the processors may execute instructions out of order from time to time, even when they are executing the same code base. This can result in different outputs from the microprocessors causing external monitoring functions to detect a mismatch and suspend operations. High assurance design principles dictate certain levels of functional and physical separation. The design issue arises because redundant data processing elements must always be ensured of processing the same information in the same order with the same results.

In a secure system, there is often a need to have data path reconfiguration for different system operations. In a high-assurance secure system, this reconfiguration function is typically established by the same redundant system elements that perform the primary functions. Both these types of processes must also be monitored to ensure correct operations. This monitoring can be particularly problematic, for example, when requests for data path reconfiguration occur asynchronously to the redundant decision making logic. Because of the asynchronous environment, the redundant decision making logic may occasionally come to different outcomes and the monitoring logic needs to provide a recovery mechanism to re-arbitrate for the correct data path before the data path is reconfigured.

SUMMARY

In one embodiment, a cryptographic processor for redundantly-processing cryptographic operations is disclosed. The cryptographic processor includes a number of input ports, a first and second cryptographic engines, comparison logic and a plurality of output ports. The number of input ports is configured to accept both plaintext and ciphertext. Each of the number of input ports is coupled to both the first and second cryptographic engines. The comparison logic is configured to determine if the first and second cryptographic engines produce a result that is different. The number of output ports is configured to produce both plaintext and ciphertext, as required.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
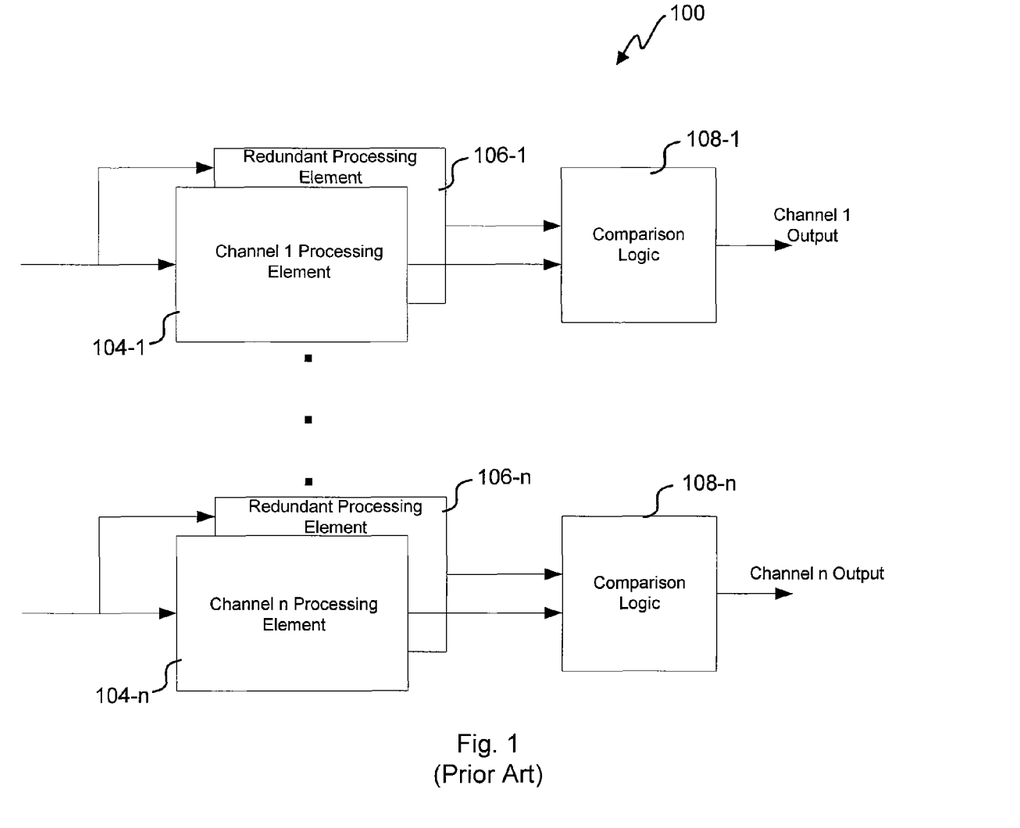
FIG. 1 depicts a block diagram of a prior art high-assurance system that has multiple ports and operates redundantly.

Referring initially to FIG. 1, a block diagram of a prior art high-assurance system 100 is shown that has multiple ports and operates redundantly. Here, each channel is handled by one processing element 104 and each processing element 104 has a dedicated redundant processing element 106. Each channel has a dedicated comparison logic circuit 108 that determines if the outputs of the processing element 104 and redundant processing element 106 match and, if so, forwards the answer onto the output circuit (not shown). In this configuration of n channels, each additional channel increases the size of the resulting circuitry in a linear fashion.

Figure 2:
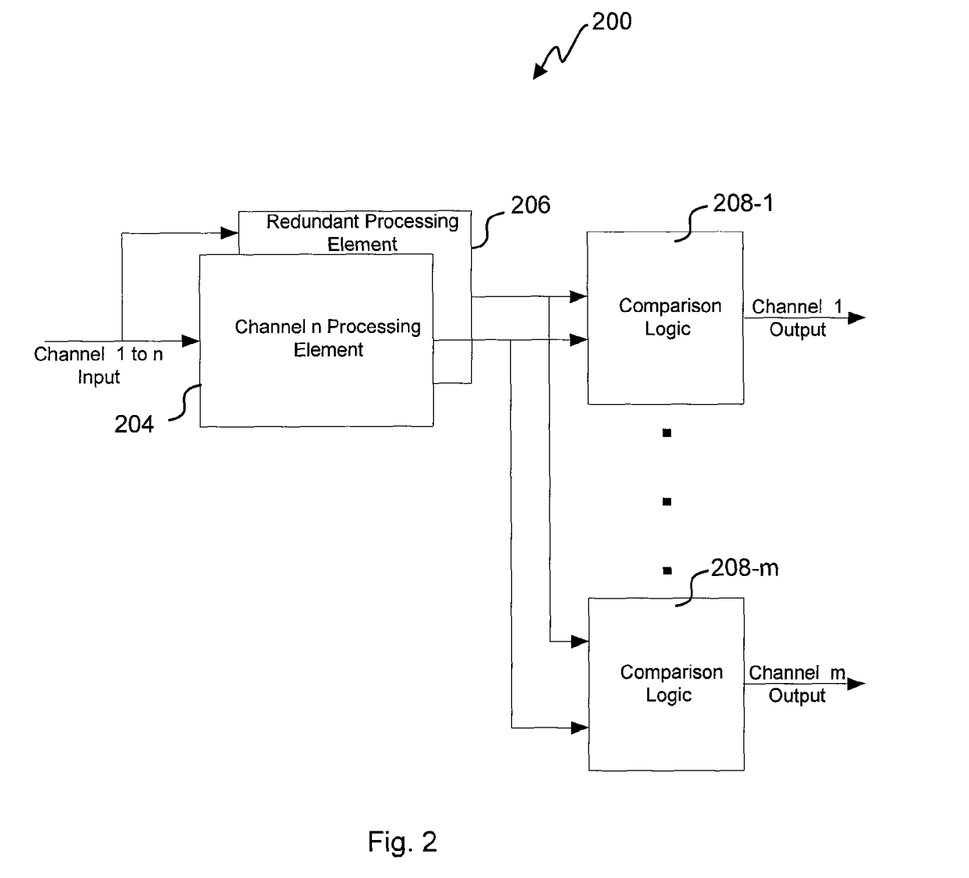
FIG. 2 depicts a block diagram of an embodiment of a multi-port cryptographic system.

With reference to FIG. 2, a block diagram of an embodiment of a multi-port cryptographic system 200 is shown. This embodiment re-uses resources for a multi-port cryptosystem 200. Here, a single channel processing element 204 and a redundant processing element 206 are shared by all the input channels 1 through n. Each channel has its own comparison logic that is controlled by a task switching controller (not shown).

The embodiment of FIG. 2 has improved efficiency over the prior art in FIG. 1. The single redundant processing element 204, 206 can handle multiple channels. The single redundant processing element 204, 206 switches among multiple channels. Additionally, the redundant processing element 204, 206 is reconfigurable to use different algorithms for each channel. Where different ports are to be serviced with different algorithms, the redundant processing element 204, 206 reconfigures itself for each channel. Each output port (1 through m) in this embodiment has its own comparison logic 208 to detect any errors in the processing element 204 or redundant processing element 206.

Figure 3:
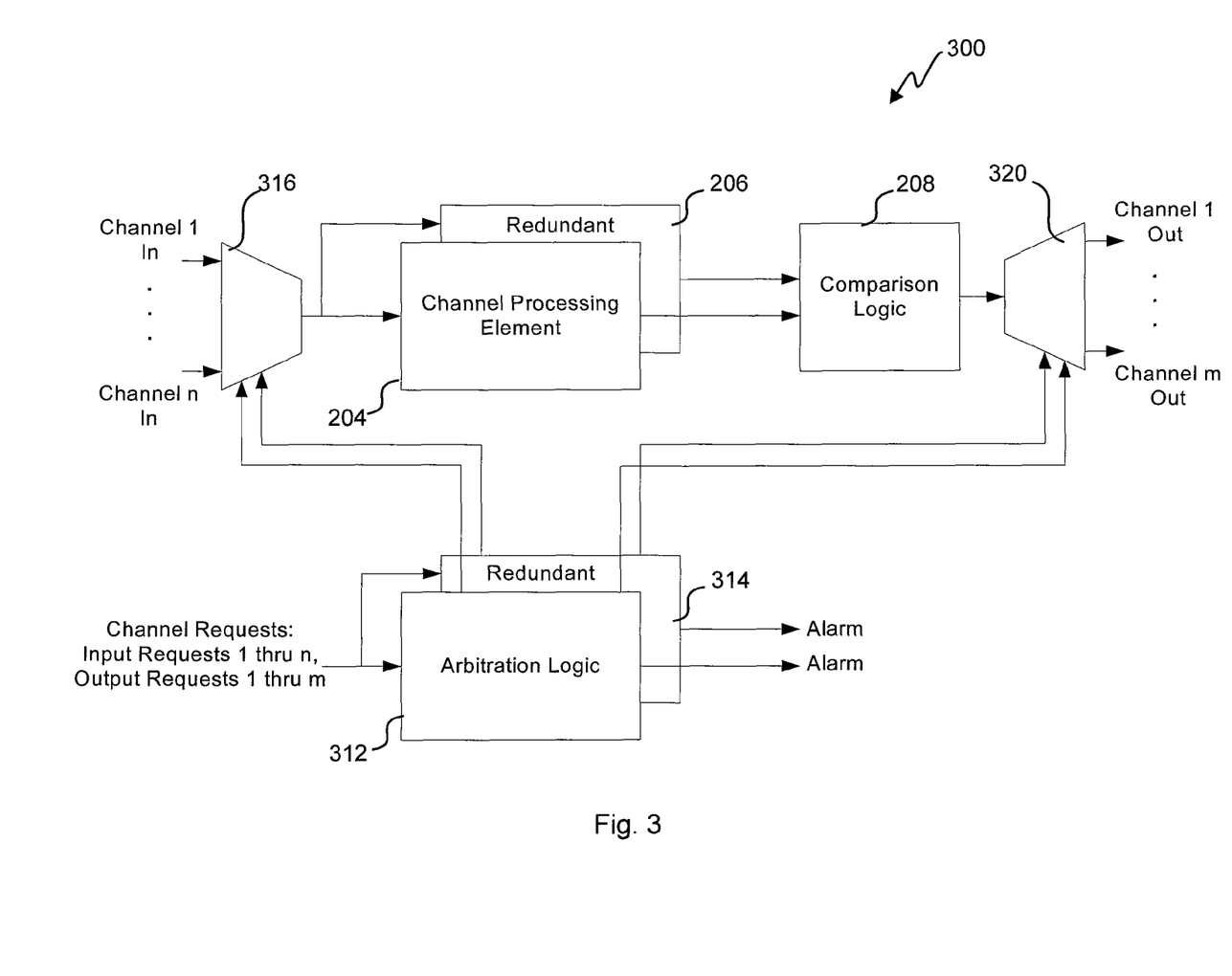
FIG. 3 depicts a block diagram of another embodiment of the multi-port cryptographic system.

FIG. 3 illustrates a block diagram of another embodiment of a multi-port cryptographic system 300. This embodiment shows redundant arbitration logic 312, 314 that multiplexes 316 input channels and demultiplexes 320 output channels. There are n input channels and m output channels in this embodiment (e.g., n=4 and m=4). Multiple input ports vie for the single redundant processing elements 204, 206. The processing elements direct their results to one of m outputs under the direction of the redundant arbitration logic 312, 314. The outputs of the redundant processing element 204, 206 are matched with comparison logic 208 to ensure consistent processing. Any mismatch of the data path processing from the processing element 204 and the redundant processing element 206 would generate an alarm. Additionally, error in the redundant arbitration logic 312, 314 would trigger an alarm. The allowable combinations of input ports and their associated outputs can be restrained through the use of the arbitration logic 312, 314. Both redundant arbitration logic 312, 314 open the same port before it is usable, implementing redundancy in this manner. For example, if the arbitration logic 312 opens a first port and the redundant arbitration logic 314 opens a second port, neither will open until the both arbitration logic 312, 314 are in agreement.

Figure 4:
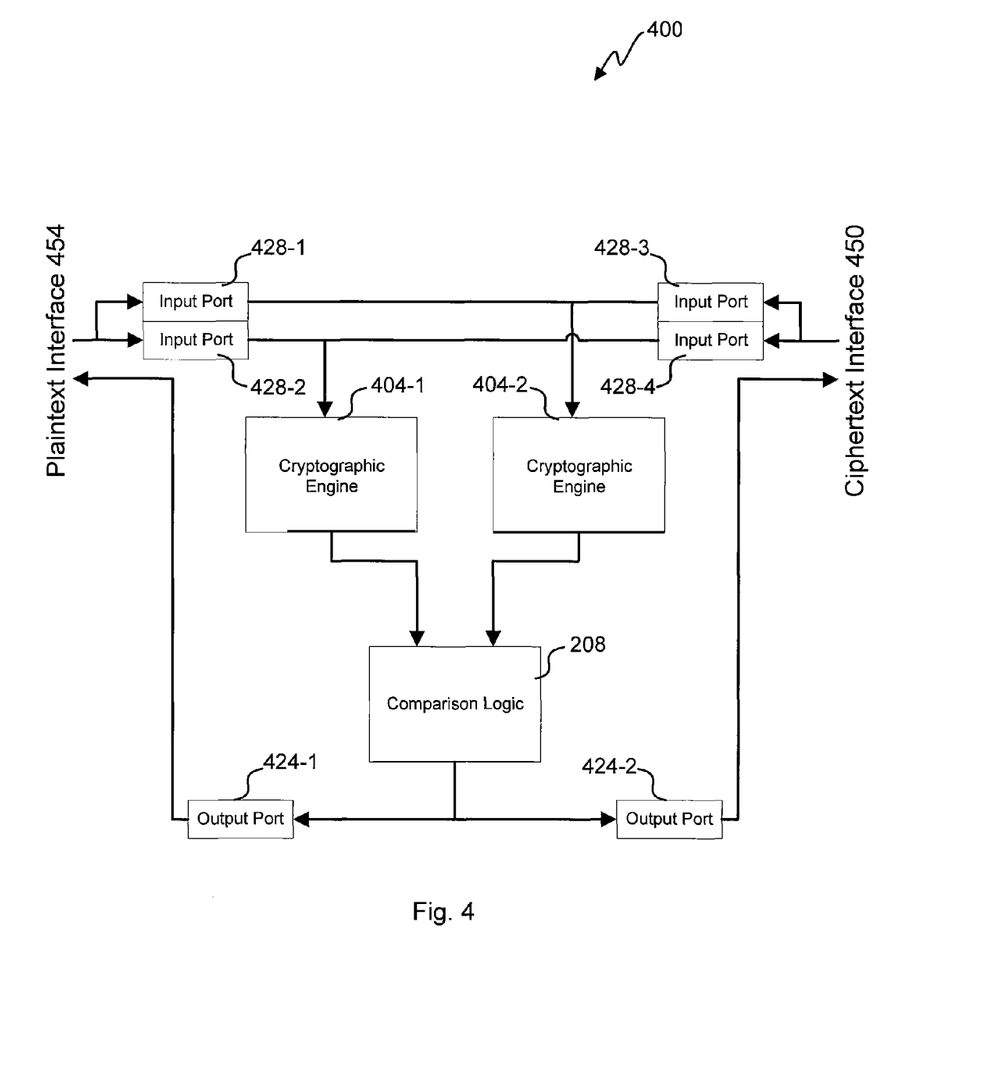
FIG. 4 depicts a block diagram of an embodiment of a bi-directional single-channel cryptographic system.

The architecture of FIG. 3 can be collapsed in one embodiment to be used in a single channel system that has a single bi-directional plaintext (PT) interface, and a single bi-directional ciphertext (CT) interface. Referring next to FIG. 4, a bi-directional single-channel cryptographic system 400 of this type is shown. Each interface 450, 454 is separated from the cryptographic engines 404 with input and output ports 428, 424 that are individually controlled according to the direction that the data is intended to be routed through the redundant cryptographic engines 404-1 and 404-2. Each interface is bidirectional to include both an input port 428 and an output port 424. The cryptographic engines 404 are programmably capable encryption, decryption, filtering, guarding, hashing, signing, and bypass for each packet. The type of processing and ports 424, 428 used can be preconfigured for a particular path from input port 428 to output port 424 and/or configured on a packet-by-packet basis.

Figure 5:
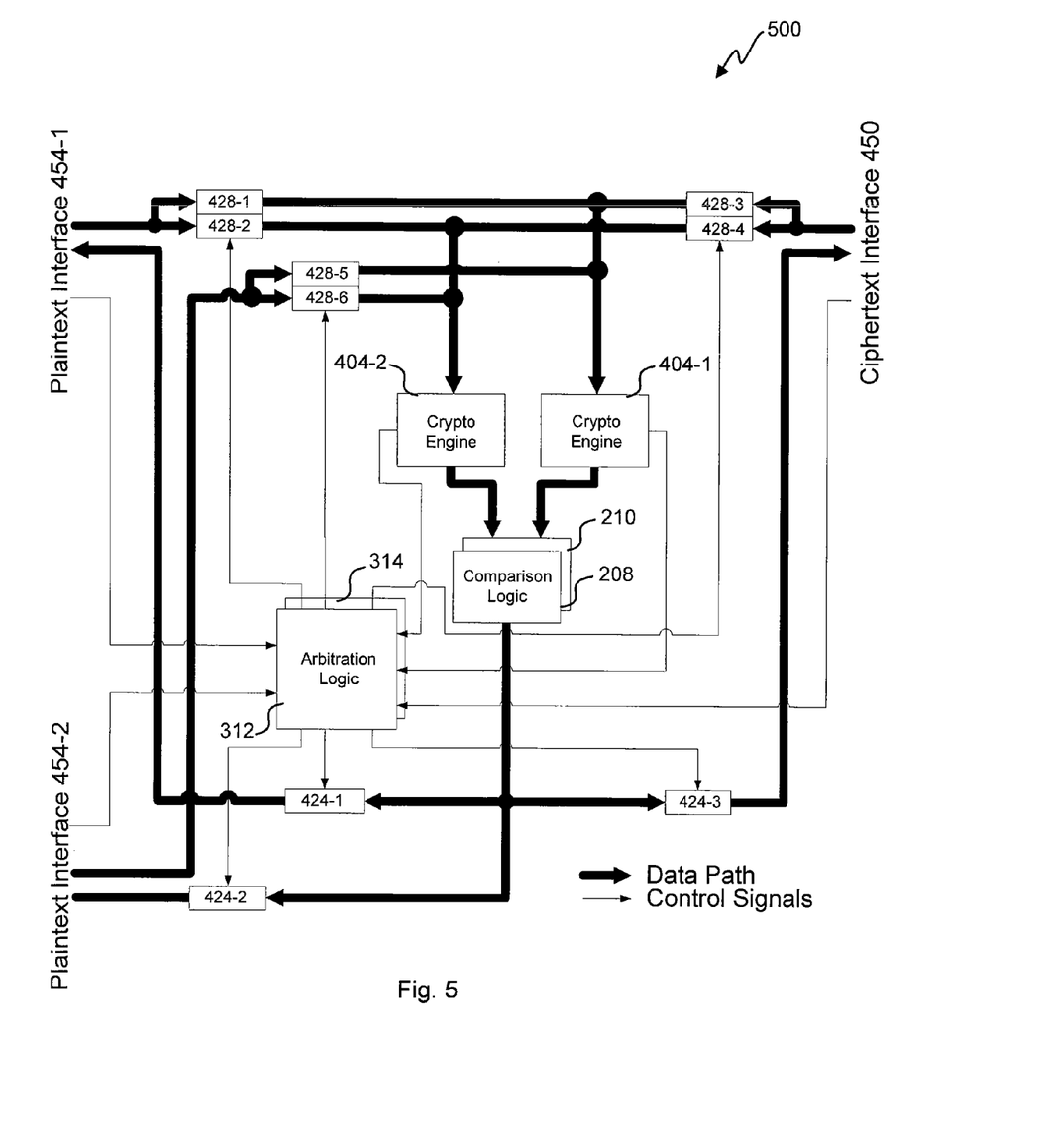
FIG. 5 depicts a block diagram of yet another embodiment of the multi-port cryptographic system.

With reference to FIG. 5, a block diagram of an embodiment a multi-port cryptographic system 500 is shown that has bi-directional interfaces. This allows for multiple, physically separate PT or CT interfaces 454, 450 to utilize a single redundant cryptographic engine 404. The number of additional PT or CT interfaces 454, 450 is limited only by the layout of the circuitry. This embodiment has two PT interfaces 454 and one CT interface 450. Additionally, the arbitration logic 312, 314 is shown. Redundancy is used throughout this specification to refer to multiple circuits that generally perform the same function, but may implement that function in the same or different ways. A redundant element mirrors another element to provide a way to check that the mirrored element is behaving properly and vice versa. A comparison is generally performed that may allow for differences in the time the result is produced by the redundant element.

Each cryptographic engine 404 has a dedicated input data bus from the input ports 428. When one of the interfaces 450, 454 has data to be routed through the cryptographic engine 404, a request is sent to redundant port arbitration logic 312, 314 to open the appropriate input port 428. For example, if PT interface one 454-1 has a data packet for the cryptographic engine 404, the PT interface 1 454-1 will request redundant input port 428-1, 428-2 to be opened. The arbitration logic 312, 314 ensures that only one input port 428 is open at a time, and that only one output port 424 is opened at a time. When the cryptographic system 500 receives the data packet, a determination is made to which output port 424 the data packet should be routed to and a request is sent to the arbitration logic 312, 314 to open the appropriate output port 424. This exemplary embodiment employs redundant comparison logic 208, 210 to compare the redundant data packets as the packets leave the cryptographic engines 404 to ensure that both cryptographic engines 404 produce the same output. The data packets are then out the open output port 424. When the entire data packet has been sent out of the output port 424, the arbitration logic 312, 314 is instructed to close all of the output ports 424. At this time, the cryptographic system 500 is ready to receive additional data packets that would cause the arbitration logic 312, 314 to configure the ports 424, 428 appropriately.

The cryptographic system 500 architecture allows multiple interfaces 450, 454 on either side of the red/black boundary to be added by simply adding a set of input and/or output ports 428, 424, and routing the appropriate control signals to the arbitration logic 312, 314. The arbitration logic 312, 314 and redundant cryptographic engine 404 are configured to use any new ports 428, 424 without additional arbitration logic 312, 314 and cryptographic engines 404. Some embodiments allow reprogramming ports 428, 424 to allow changing CT interfaces 450 to PT interfaces 454 and vice-versa. In one embodiment, this can be done during normal operation, while other embodiments allow reassignment only during system configuration.

The arbitration logic 312, 314 accepts requests from single or redundant elements and acts upon them based upon some pre-established priority. If asynchronous requests result in mis-synchronization of port selection into the data path, the cryptographic system 500 forces the arbitration logic 312, 314 to re-arbitrate. This process would continue until two matching tasks are established. When the port selections do not agree for points leaving the data path, an alarm is generated. One advantage to this embodiment is that decisions are made in a fully independent fashion and results independently compared.

Figure 6:
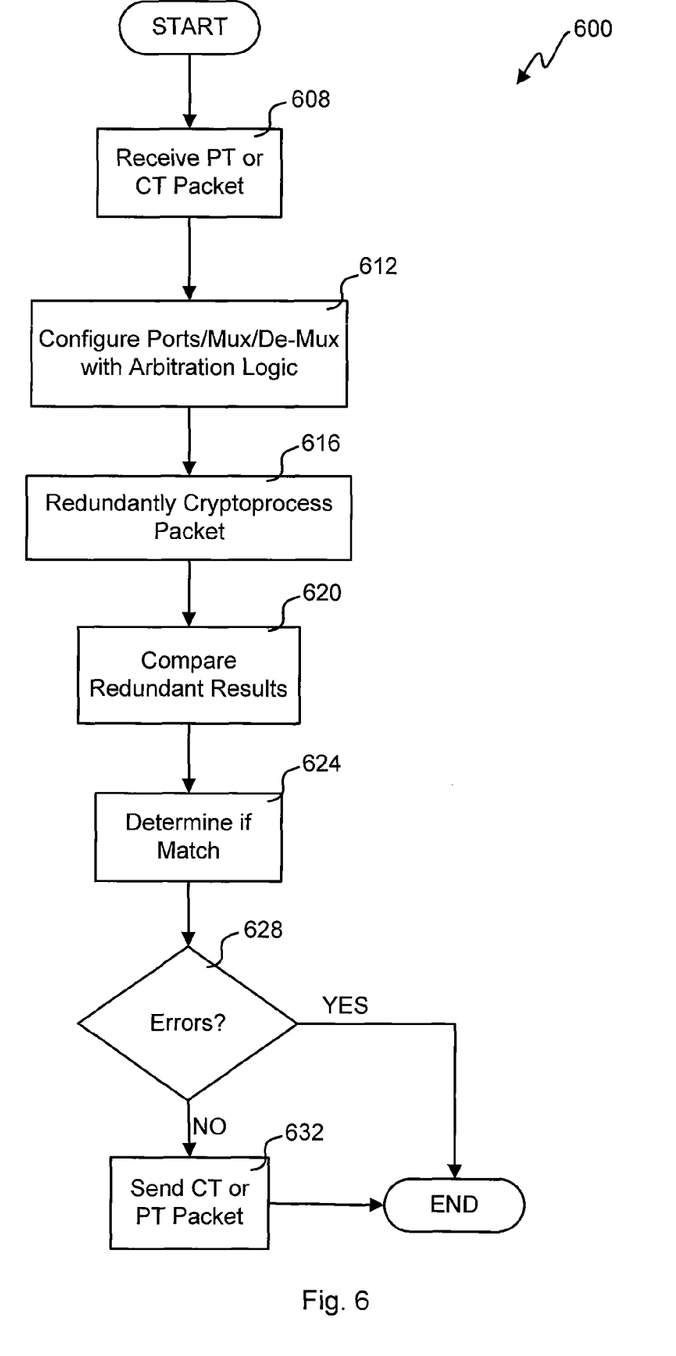
FIG. 6 illustrates a flowchart of an embodiment of a process for processing packets with the cryptographic system.

Referring next to FIG. 6, a flowchart of an embodiment of a process 600 for processing packets with the cryptographic system is illustrated. The depicted portion of the process 600 begins in block 608 where a PT or CT packet is received on the appropriate interface 450, 454. The arbitration logic 312, 314 is manipulated to configure the input port 428, the output port 424, and any multiplexing 316 and de-multiplexing 320 in block 612. The packet is redundantly processed in block 616. A task matching process may be used to keep the processing somewhat synchronized.

In block 620, the results are compared. Some embodiments have synchronizers to realign the results before comparison. A determination is made in block 624 to conclude if there is a match between the results. Where there are errors in the match process as determined in block 628, the process 600 ends. Where there is no error found, processing goes from block 628 to block 632 where the CT or PT packet is sent out of the cryptographic system.

Figure 7:
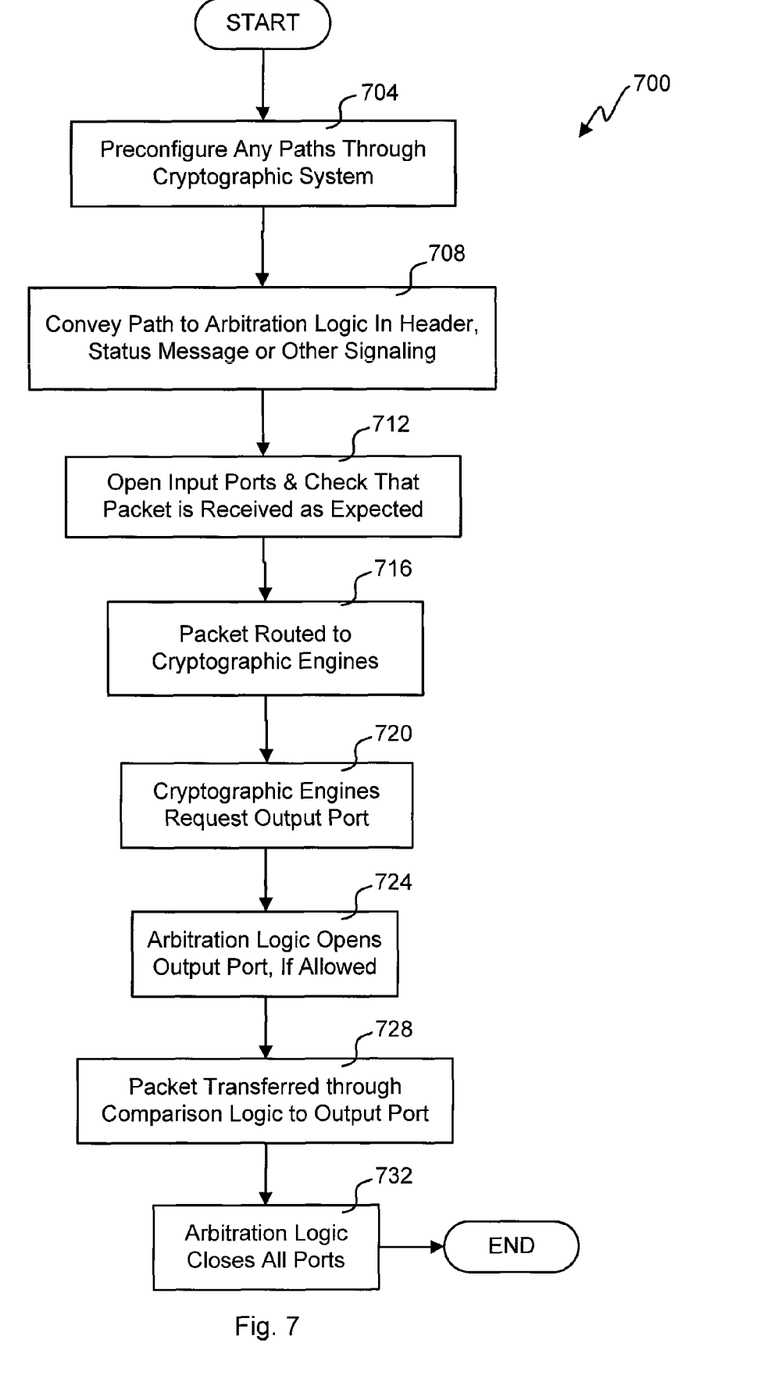
FIG. 7 illustrates a flowchart of an embodiment of a process for arbitrating ports for the cryptographic system.

Referring next to FIG. 7, a flowchart of an embodiment of a process 700 for arbitrating ports for the cryptographic system is illustrated. The depicted portion of the process 700 may begin in block 704 where paths through the cryptographic system may be preconfigured. For example, a particular input port 428 can be dedicated to a particular output port 424 along with particular cryptographic processing. Certain paths can be also configured to be disallowed, for example plaintext interface 454 to ciphertext interface 428 bypass could be made an invalid path. Codes or status lines for selecting particular paths could be configured. Some embodiments can work in preconfigured or configured on-the-fly modes. For on-the-fly mode, each packet can have a path configured dynamically.

In block 708, the path for a packet is somehow conveyed to the arbitration logic 312, 314. This path could be preconfigured, conveyed in a metadata header, conveyed in a separate message, and/or signaled with a status line in various embodiments. The input redundant ports 428 indicated by the selected path are opened by the arbitration logic 314 in block 712. Additionally, the packet received on those redundant ports 428 may be checked in various ways to check for improper formatting or corruption. A packet that is received on redundant input ports 428 in a manner inconsistent with the selected path can be rejected.

In block 716, the packet is routed to the redundant cryptographic engines 404 for processing consistent with what was specified. The cryptographic engines 404 are aware of the path and request the output port in block 720. In other embodiments, the arbitration logic 312, 314 configures the output port 424 without help from the cryptographic engine 404. Back to this embodiment in block 724 where the arbitration logic opens the output port requested by the cryptographic engine 404, if allowed. Certain paths are configured to be unallowable and the specified path indicates the output port. Should the arbitration logic 312, 314 find something inconsistent with the configuration or path is requested, nothing will be opened. Both redundant arbitration logic 312, 314 are in agreement before a particular output port 424 is opened.

The processed packet is transferred through the comparison logic 208, 210 in block 728 to the selected output port 424. In block 732, the arbitration logic 312, 314 closes the input and/or output ports 428, 424. This completes the processing of a particular packet. Control over the ports in a cryptographic system, which reuses cryptographic engines, for multiple packet streams is provided in this manner for one embodiment.

A number of variations and modifications of the disclosed embodiments can also be used. For example, some of the above embodiments discuss working with packetized information. This specification is also applicable to streams of information. Those streams can be packetized outside of the cryptographic system or within. In either event, the single redundant cryptographic engine or channel processing element can switch between processing for two or more input ports. The processed packets and be reassembled into a stream internal to the cryptographic system or outside. Some embodiments of the cryptographic system may accept packetized information and produce a stream or vice versa.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Moreover, as disclosed herein, the term storage or machine-readable medium may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

What is claimed is:

1. A cryptographic processor for redundantly-processing cryptographic operations, the cryptographic processor comprising:
    a first input port and a second input port, wherein at least one of the first or second input ports is configured to accept a first plaintext packet and a first ciphertext packet;
    a first output port and a second output port;
    a first cryptographic engine coupled to both the first and second input ports and configured to perform a first instance of an encryption process to produce a first ciphertext output by processing the first plaintext packet, and to perform a first instance of a decryption process to produce a first plaintext output by processing the first ciphertext packet;
    a second cryptographic engine coupled to both the first and second input ports and configured to perform a second instance of the encryption process to produce a second ciphertext output by processing the first plaintext packet, and to perform a second instance of the decryption process to produce a second plaintext output by processing the first ciphertext packet;
    a first arbitration logic and a second arbitration logic configured to redundantly open either the first input port or the second input port and to redundantly direct the first plaintext packet along a first one of a plurality of paths to be processed redundantly by the first and second cryptographic engines, and to redundantly direct the first ciphertext packet along a second one of the plurality of paths to be processed redundantly by the first and second cryptographic engines, the first one of the plurality of paths and the second one of the plurality of paths being different paths, wherein either the first input port or the second input port is only opened if the first arbitration logic and the second arbitration logic are in agreement as to which ort to open, and wherein the first arbitration logic and the second arbitration logic are configured to direct the first plaintext packet and the first ciphertext packet along the plurality of paths in a time multiplexed fashion such that only one of the first plaintext packet or the first ciphertext packet is directed to the first and second cryptographic engines at any one time; and
    comparison logic, wherein the comparison logic is configured to determine if the first and second ciphertext outputs match and to determine if the first and second plaintext outputs match,
    wherein at least one of the first or second output ports is configured to produce a second plaintext packet and a second ciphertext packet,
    wherein the first arbitration logic and the second arbitration logic are configured to redundantly ensure that only one of the first or second input ports is open at a time and that only one of the first or second output ports is open at a time,
    wherein after the second plaintext packet and the second ciphertext packet are produced, the first arbitration logic and the second arbitration logic are configured to close the first and second input ports and the first and second output ports.

2. The cryptographic processor for redundantly-processing cryptographic operations as recited in claim 1, further comprising:
    a first bus, wherein:
    the first bus is coupled to both of the first and second input ports, and
    the first bus is coupled to at least one of the first and second cryptographic engines; and
    a second bus, wherein:
    the second bus is coupled to both of the first and second input ports, and
    the second bus is coupled to at least one of the first and second cryptographic engines.

3. The cryptographic processor for redundantly-processing cryptographic operations as recited in claim 1, wherein the first and second cryptographic engines are programmably configured to perform encryption, decryption, filtering, guarding, hashing, signing, and bypass.

4. The cryptographic processor for redundantly-processing cryptographic operations as recited in claim 1, wherein the first plaintext packet cryptographically corresponds to the second ciphertext packet.

5. The cryptographic processor for redundantly-processing cryptographic operations as recited in claim 1, wherein the first ciphertext packet cryptographically corresponds to the second plaintext packet.

6. The cryptographic processor for redundantly-processing cryptographic operations as recited in claim 1, wherein the first plaintext packet corresponds to the second plaintext packet.

7. The cryptographic processor for redundantly-processing cryptographic operations as recited in claim 1, wherein the first plaintext packet is received coextensively in time with the first ciphertext packet.

8. The cryptographic processor for redundantly-processing cryptographic operations as recited in claim 1, wherein the first plaintext packet is received at a different time than the first ciphertext packet.

9. The cryptographic processor for redundantly-processing cryptographic operations as recited in claim 1, wherein the first and second cryptographic engines perform some tasks at a same time, but not other tasks.

10. The cryptographic processor for redundantly-processing cryptographic operations as recited in claim 1, wherein the first and second cryptographic engines do not perform tasks in lock-step.

11. The cryptographic processor for redundantly-processing cryptographic operations of claim 1, wherein the plurality of paths include:
    a first path between the first input port and the first output port,
    a second path between the first input port and the second output port, and a third path between the second input port and at least one of the first or second output ports.

12. The cryptographic processor for redundantly-processing cryptographic operation as in claim 1, wherein the plurality of paths through the cryptographic processor are pre-configured.

13. The cryptographic processor for redundantly-processing cryptographic operations as in claim 1, wherein the first arbitration logic and the second arbitration logic accept requests from single or redundant elements and acts on the requests based on a pre-determined priority.

14. The cryptographic processor for redundantly-processing cryptographic operations as in claim 1, wherein if asynchronous requests result in mis-synchronization of port selection into a data path, the cryptographic processor forces the arbitration logic to re-arbitrate.

15. The cryptographic processor for redundantly-processing cryptographic operations as in claim 14, wherein if re-arbitration is not successful, an alarm is generated.

16. The cryptographic processor for redundantly-processing cryptographic operations as in claim 1, wherein the first arbitration logic and the second arbitration logic support multiple, physically-separated plaintext and ciphertext interfaces.

17. A method for cryptographically processing packetized information, the method comprising steps of:
receiving a first plaintext packet;
receiving a first ciphertext packet, wherein a plurality of input ports accept the first plaintext and ciphertext packets;
redundantly directing, in a time multiplexed fashion, the first plaintext packet along a first one of a plurality of paths to be processed redundantly by first and second instances of an encryption process, and redundantly directing the first ciphertext packet along a second one of the plurality of paths to be processed redundantly by first and second instances of a decryption process, wherein the first plaintext packet is redundantly directed along the first one of the plurality of paths and the first ciphertext packet is redundantly directed along the second one of the plurality of paths using a first arbitration logic and a second arbitration logic, the first one of the plurality of paths and the second one of the plurality of paths being different paths, wherein time multiplexed directing of the first plaintext packet and the first ciphertext packet is done such that only one of the first plaintext packet or the first ciphertext packet is directed to first and second cryptographic engines at any one time, and the plurality of input ports are only opened to accept the first plaintext packet and the first ciphertext packet if the first arbitration logic and the second arbitration logic are in agreement as to which ports to open;
processing the first plaintext packet with the first instance of the encryption process to produce a first ciphertext output and processing the first ciphertext packet with the first instance of the decryption process to produce a first plaintext output;
redundantly performing the processing step with the second instances of the encryption and decryption processes to produce a second ciphertext output and a second plaintext output;
comparing the first ciphertext output with the second ciphertext output and comparing the first plaintext output with the second plaintext output;
determining if the first and second ciphertext outputs match and if the first and second plaintext outputs match; and
producing a second plaintext packet and a second ciphertext packet,
wherein the first arbitration logic and the second arbitration logic are configured to redundantly ensure that only one of the plurality of input ports is open at a time and that only one of a plurality of output ports is open at a time,
wherein after the second plaintext packet and the second ciphertext packet are produced, the first arbitration logic and second arbitration logic close the plurality of input ports and the plurality of output ports.

18. The method for cryptographically processing packetized information as recited in claim 17, wherein the second plaintext packet corresponds to the first and second plaintext outputs and cryptographically corresponds to the first ciphertext packet.

19. The method for cryptographically processing packetized information as recited in claim 17, wherein the second ciphertext packet corresponds to the first and second ciphertext outputs and cryptographically corresponds to the first plaintext packet.

20. The method for cryptographically processing packetized information as recited in claim 17, wherein the second plaintext packet corresponds to the first and second ciphertext outputs and corresponds to the first plaintext packet.

21. The method for cryptographically processing packetized information as recited in claim 17, further comprising steps of:
processing metadata associated with the first plaintext packet; and
customizing the processing step according to the metadata.

22. The method for cryptographically processing packetized information as recited in claim 17, wherein the plurality of paths include:
a first path between a first input port and a first output port,
a second path between the first input port and a second output port, and
a third path between a second input port and at least one of the first or second output ports.

23. A non transitory machine-readable medium having machine-executable instructions configured to cryptographically process packetized information, the machine-executable instructions comprising:
instructions for receiving a first plaintext packet;
instructions for receiving a first ciphertext packet, wherein a plurality of input ports accept the first plaintext and ciphertext packets;
instructions for redundantly directing, in a time multiplexed fashion, the first plaintext packet along a first one of a plurality of paths to be processed redundantly by first and second instances of an encryption process, and redundantly directing the first ciphertext packet along a second one of the plurality of paths to be processed redundantly by first and second instances of a decryption process, wherein the first plaintext packet is redundantly directed along the first one of the plurality of paths and the first ciphertext packet is redundantly directed along the second one of the plurality of paths using a first arbitration logic and a second arbitration logic, the first one of the plurality of paths and the second one of the plurality of paths being different paths, wherein time multiplexed directing of the first plaintext packet and the first ciphertext packet is done such that only one of the first plaintext packet or the first ciphertext packet is directed to first and second cryptographic engines at any one time, and the plurality of input ports are only opened to accept the first plaintext packet and the first ciphertext packet if the first arbitration logic and the second arbitration logic are in agreement as to which ports to open;
instructions for processing the first plaintext packet with the first instance of the encryption process to produce a first ciphertext output and processing the first ciphertext packet with the first instance of the decryption process to produce a first plaintext output;
instructions for redundantly performing the processing step with the second instances of the encryption and decryption processes to produce a second ciphertext output and a second plaintext output;
instructions for comparing the first ciphertext output with the second ciphertext output and comparing the first plaintext output with the second plaintext output;
instructions for determining if the first and second ciphertext outputs match and if the first and second plaintext outputs match;
instructions for producing a second plaintext packet and a second ciphertext packet;
instructions for redundantly ensuring that only one of the plurality of input ports is open at a time and that only one of a plurality of output ports is open at a time; and
instructions to close the plurality of input ports and the plurality of output ports after the second plaintext packet and the second ciphertext packet are produced.

24. A machine adapted to cryptographically process packetized information, the machine comprising:
a first receiving module configured to receive a first plaintext packet;
a second receiving module configured to receive a first ciphertext packet, wherein a plurality of input ports accept the first plaintext and ciphertext packets;
a directing module configured to redundantly direct, in a time multiplexed fashion, the first plaintext packet along a first one of a plurality of paths to be processed redundantly by first and second instances of an encryption process, and to redundantly direct the first ciphertext packet along a second one of the plurality of paths to be processed redundantly by first and second instances of a decryption process, wherein the first plaintext packet is redundantly directed along the first one of the plurality of paths and the first ciphertext packet is redundantly directed along the second one of the plurality of paths using a first arbitration logic and a second arbitration logic, the first one of the plurality of paths and the second one of the plurality of paths being different paths, wherein time multiplexed directing of the first plaintext packet and the first ciphertext packet is done such that only one of the first plaintext packet or the first ciphertext packet is directed to first and second cryptographic engines at any one time, and the plurality of input ports are only opened to accept the first plaintext packet and the first ciphertext packet if the first arbitration logic and the second arbitration logic are in agreement as to which ports to open;
a first processing module configured to process the first plaintext packet with the first instance of the encryption process to produce a first ciphertext output and to process the first ciphertext packet with the first instance of the decryption process to produce a first plaintext output;
a second processing module configured to redundantly perform the processing step with the second instances of the encryption and decryption processes to produce a second ciphertext output and a second plaintext output;
a comparing module configured to compare the first ciphertext output with the second ciphertext output and to compare the first plaintext output with the second plaintext output;
a determining module configured to determine if the first and second ciphertext outputs match and if the first and second plaintext outputs match; and
a producing module configured to produce a second plaintext packet and a second ciphertext packet,
wherein the first arbitration logic and the second arbitration logic are configured to redundantly ensure that only one of the plurality of input ports is open at a time and that only one of a plurality of output ports is open at a time,
wherein after the second plaintext packet and the second ciphertext packet are produced, the first arbitration logic and second arbitration logic are configured to close the plurality of input ports and the plurality of output ports.

25. A cryptographic system for redundantly-processing cryptographic operations, the system comprising:
a plurality of input ports and a plurality of output ports;
a first cryptographic engine coupled to the plurality of input ports and the plurality of output ports and configured to process a first packet accepted by one of the plurality of input ports with a first version of a first cryptographic process to produce a first output;
a second cryptographic engine coupled to the plurality of input ports and the plurality of output ports and configured to process the first packet with a second version of the first cryptographic process to produce a second output;
a first arbitration logic and a second arbitration logic configured to redundantly open the plurality of input ports and to redundantly direct at least a portion of packets accepted by the plurality of input ports along a plurality of paths to be processed redundantly by the first and second cryptographic engines, each of the plurality of paths being between one of the plurality of input ports and at least one of the plurality of output ports, wherein:
the portion of the packets includes the first packet, and
the first arbitration logic and the second arbitration logic are configured to direct the portion of the packets accepted by the plurality of the input ports along the plurality of paths in a time multiplexed fashion such that packets accepted by only one of the plurality of input ports are directed to the first and second cryptographic engines at any one time, wherein the one of the plurality of input ports is only opened to accept the packets if the first arbitration logic and second arbitration logic are in agreement as to which port to open; and
comparison logic configured to determine if the first and second outputs match,
wherein the first arbitration logic and the second arbitration logic are configured to redundantly ensure that only one of the plurality of input ports is open at a time and that only one of the plurality of output ports is open at a time.

26. The cryptographic system for redundantly-processing cryptographic operations of claim 25, wherein the plurality of paths include:
a first path between a first input port of the plurality of input ports and a first output port of the plurality of output ports,
a second path between the first input port of the plurality of input ports and a second output port of the plurality of output ports, and
a third path between a second input port of the plurality of input ports and at least one of the first or second output ports.

* * * * *